(12) United States Patent
Lee et al.

(10) Patent No.: US 8,438,444 B2
(45) Date of Patent: May 7, 2013

(54) METHOD OF ASSOCIATING AUTOMATIC REPEAT REQUEST WITH HYBRID AUTOMATIC REPEAT REQUEST

(75) Inventors: Jin Lee, Seoul (KR); Tae Gon Kong, Gumi-si (KR); Yong Ho Kim, Incheon-si (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 12/997,170

(22) PCT Filed: May 21, 2009

(86) PCT No.: PCT/KR2009/002681
§ 371 (c)(1),
(2), (4) Date: Dec. 9, 2010

(87) PCT Pub. No.: WO2010/002105
PCT Pub. Date: Jan. 7, 2010

(65) Prior Publication Data
US 2011/0119549 A1    May 19, 2011

(30) Foreign Application Priority Data
Jul. 1, 2008  (KR) .................. 10-2008-0063547

(51) Int. Cl.
*H04L 1/18* (2006.01)
*H04L 1/00* (2006.01)
*H04Q 1/20* (2006.01)

(52) U.S. Cl.
USPC ........... 714/748; 714/749; 370/216; 370/241; 370/242; 375/224; 455/8

(58) Field of Classification Search .................. 714/748, 714/749; 370/216, 241, 242; 375/224; 455/8
See application file for complete search history.

(56) References Cited

U.S. PATENT DOCUMENTS

| | | | |
|---|---|---|---|
| 7,509,554 B2 * | 3/2009 | Lohr et al. | 714/748 |
| 7,773,524 B2 * | 8/2010 | Lim et al. | 370/236 |
| 7,895,494 B2 * | 2/2011 | Terry et al. | 714/748 |
| 7,979,768 B2 * | 7/2011 | Sammour et al. | 714/748 |
| 8,050,248 B2 * | 11/2011 | Meyer et al. | 370/349 |
| 2002/0004924 A1 | 1/2002 | Kim et al. | |
| 2002/0071407 A1 | 6/2002 | Koo et al. | |
| 2002/0093937 A1 | 7/2002 | Kim et al. | |
| 2004/0004954 A1 * | 1/2004 | Terry et al. | 370/349 |
| 2004/0009766 A1 * | 1/2004 | Hong | 455/422.1 |
| 2004/0009786 A1 * | 1/2004 | Terry | 455/522 |
| 2004/0010736 A1 | 1/2004 | Alapuranen | |
| 2004/0205105 A1 * | 10/2004 | Larsson et al. | 709/200 |
| 2007/0177630 A1 * | 8/2007 | Ranta et al. | 370/473 |
| 2007/0259665 A1 * | 11/2007 | Chiu et al. | 455/436 |
| 2008/0170522 A1 * | 7/2008 | Sammour et al. | 370/310 |
| 2009/0259908 A1 * | 10/2009 | Gollapudi | 714/748 |
| 2010/0157901 A1 * | 6/2010 | Sanderovitz et al. | 370/328 |
| 2010/0325507 A1 * | 12/2010 | Sung et al. | 714/749 |
| 2011/0032897 A1 * | 2/2011 | Ihm et al. | 370/329 |
| 2012/0269074 A1 * | 10/2012 | Sagfors et al. | 370/242 |

* cited by examiner

*Primary Examiner* — John J Tabone, Jr.
(74) *Attorney, Agent, or Firm* — Birch, Stewart, Kolasch & Birch, LLP

(57) ABSTRACT

A method of associating ARQ with HARQ is disclosed. The method includes constructing a plurality of coding blocks using an MPDU received from an ARQ entity of a transmitter, transmitting each of the coding blocks to a receiver according to an HARQ operation, discontinuing the coding block transmission, when transmission of a coding block is failed, transmitting an error message indicating a number of the failed coding block to the ARQ entity of the transmitter, receiving ARQ blocks corresponding to the failed coding block from the ARQ entity of the transmitter, constructing at least one coding block using the received ARQ blocks, and retransmitting the at least one coding block to the receiver according to the HARQ operation.

7 Claims, 9 Drawing Sheets

--BACKGROUND ART--

--BACKGROUND ART--

FIG. 3A --BACKGROUND ART--
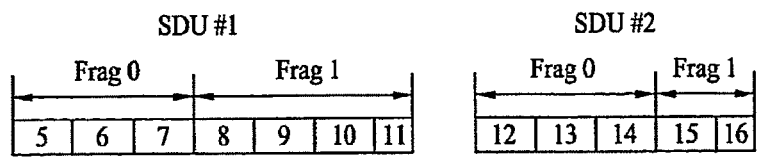
FIG. 3B --BACKGROUND ART--
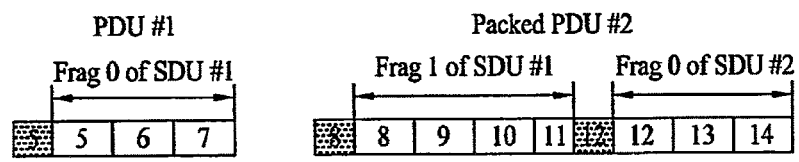
FIG. 3C --BACKGROUND ART--
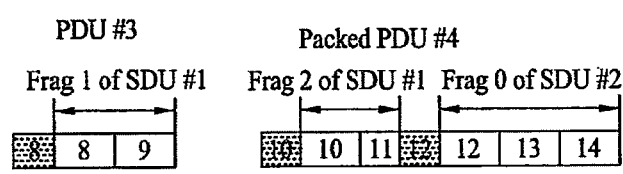
FIG. 3D --BACKGROUND ART--
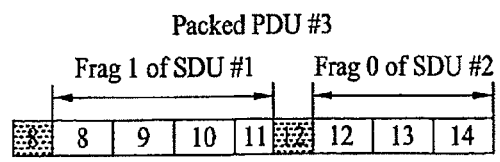

METHOD OF ASSOCIATING AUTOMATIC REPEAT REQUEST WITH HYBRID AUTOMATIC REPEAT REQUEST

FIELD OF THE INVENTION

The present invention relates to association between Automatic Repeat reQuest (ARQ) and Hybrid Automatic Repeat reQuest (HARQ), and more particularly, to a packet transmission method of effectively using resources, ensuring reliability.

BACKGROUND ART

FIG. 1 illustrates a relationship between Protocol Data Units (PDUs) and Service Data Units (SDUs) in a protocol stack.

From the perspective of a protocol layer, a data unit received from an upper layer is called an SDU and a data unit created by processing the SDU, to be transmitted to a lower layer is called a PDU. For instance, a data unit that a Medium Access Control (MAC) layer receives from an Internet Protocol (IP) layer or a Convergence Sublayer (CS) is called a MAC SDU and the MAC SDU is processed to a MAC PDU, for transmission to a PHYsical (PHY) layer.

FIG. 2 illustrates an exemplary method of converting an SDU to a PDU.

Referring to FIG. 2, an SDU is segmented into ARQ blocks each being an ARQ unit. Then an MAC PDU is constructed with ARQ blocks by fragmentation or packing according to a transmission situation. In FIG. 2, SDU #1 is segmented into ARQ blocks according to a predetermined ARQ block size (ARQ blocks #5 to #11). Since ARQ block #11 is smaller than the predetermined ARQ block size, it remains smaller. MAC PDU #1 is constructed with a first fragment, Frag 0, of SDU #1, whereas MAC PDU #2 is constructed with a second fragment, Frag 1, of SDU #1 and a first fragment, Frag 0, of SDU #2.

FIGS. 3A to 3D illustrate retransmissions of erroneous blocks in ARQ.

FIG. 3A illustrates two successive MAC SDUs for the same connection.

If a packed PDU #2 is lost due to errors in FIG. 3B, the lost PDU is retransmitted as illustrated in FIG. 3C or 3D. The retransmitted PDU is necessarily not identical to the previously transmitted PDU.

Referring to FIG. 3C, the lost ARQ blocks, ARQ blocks #8 to #14 included in the lost PDU, PDU #2 may be rearranged to a PDU #3 including ARQ blocks #8 and #9 and a PDU #4 including ARQ blocks #10 to #14.

Referring to FIG. 3D, without rearrangement, a PDU with the same lost ARQ blocks as initially transmitted is retransmitted.

FIG. 4 is a simplified diagram illustrating a signal flow for an ARQ operation.

ARQ retransmission is carried out on a block basis and one or more ARQ blocks may be retransmitted. A receiving ARQ entity (ARQ Rx) may transmit a Negative Acknowledgment (NACK) message for a failed ARQ block and a transmitting ARQ entity (ARQ Tx) may attempt to retransmit only the ARQ block for which it has received the NACK message.

Referring to FIG. 4, the ARQ Tx transmits ARQ blocks labeled with sequence numbers to the ARQ Rx in step 410. The ARQ Rx determines whether the ARQ blocks fall into an ARQ window and there is any duplicate ARQ block among them by checking their sequence numbers.

If the ARQ Rx fails to receive ARQ block #1, it transmits a NACK message for ARQ block #1 to the ARQ Tx in step 420.

Upon receipt of the NACK message, the ARQ Tx may retransmit ARQ block #1 after waiting until a time ARQ_RE-TRY_TIMEOUT expires in step 430. A time ARQ_BLOCK_LIFETIME is set for each ARQ block and the ARQ Tx manages the status of the ARQ block within the time. If the ARQ Tx fails to receive an Acknowledgment (ACK)/NACK message for an ARQ block until expiration of a time ARQ_BLOCK_LIFETIME for the ARQ block in step 440, it discards the ARQ block and does not manage it any longer.

FIG. 5 is a simplified diagram illustrating a signal flow for a conventional ARQ operation involving an HARQ operation.

A transmitting HARQ entity (HARQ Tx) receives MAC PDUs (hereinafter, referred to as MPDUs) from a transmitting ARQ entity (ARQ Tx). The HARQ Tx may construct one or more coding block by segmenting or concatenating MPDUs and attach a Cyclic Redundancy Check (CRC) to each coding block. A coding block may be configured to include four subpackets according to a used coding scheme. In the illustrated case of FIG. 5, a receiving HARQ entity (HARQ Rx) increases reception successbility by soft-combining subpackets in case of using Incremental Redundancy (IR) being an HARQ technique.

When the HARQ Rx successfully receives and decodes a first subpacket, it transmits an ACK message for the first subpacket to the HARQ Tx. Upon receipt of the ACK message, the HARQ Tx discontinues transmission of the remaining three subpackets. If the HARQ Rx fails to receive the first subpacket as illustrated in FIG. 5, it transmits a NACK message for the first subpacket and the HARQ Tx transmits the next subpacket. This operation continues until the HARQ Rx receives the coding block successfully or fails to receive as many subpackets as a maximum retransmission number.

After repeating the above operation, the HARQ Rx provides the received coding block to a receiving ARQ entity (ARQ Rx). The ARQ Rx, which is at the MAC level, checks the CRC of the coding block. If errors are found in ARQ blocks, the ARQ Rx transmits a NACK message for the erroneous ARQ blocks. When a packet error occurs between the HARQ Tx and the HARQ Rx, an error is also detected in ARQ blocks associated with the coding block.

In FIG. 5, the ARQ Rx transmits an ARQ NACK message for erroneous ARQ blocks to the ARQ Tx, and the ARQ Tx constructs a new MPDU to retransmit the erroneous ARQ blocks. The new MPDU may be identical to or different from the initially transmitted MPDU, in configuration.

In a conventional broadband wireless access system, for a Mobile Station (MS) operating in both HARQ and ARQ, packet retransmissions are independently carried out according to HARQ and ARQ retransmission protocols. Therefore, if an MPDU is divided into a plurality of HARQ blocks, there is no interaction between an HARQ operation and an ARQ operation. As a result, an HARQ entity should receive the entire MPDU redundantly from an ARQ entity, irrespective of whether transmission of each HARQ block is failed or not.

An object of the present invention devised to solve the problem lies on a method of associating ARQ with HARQ to fast retransmit an erroneous coding block and prevent unnecessary retransmission of the same data, when ARQ and HARQ are operated simultaneously.

SUMMARY OF YHE INVENTION

The object of the present invention can be achieved by providing a method of associating ARQ with HARQ, including constructing a plurality of coding blocks using an MPDU received from an ARQ entity of a transmitter, transmitting each of the coding blocks to a receiver according to an HARQ operation, discontinuing the coding block transmission, when transmission of a coding block is failed, transmitting an error message indicating a number of the failed coding block to the ARQ entity of the transmitter, receiving ARQ blocks corresponding to the failed coding block from the ARQ entity of the transmitter, constructing at least one coding block using the received ARQ blocks, and retransmitting the at least one coding block to the receiver according to the HARQ operation.

The error message transmission may include, determining that the transmission of the coding block is failed, when as many NACK messages as a maximum retransmission number or more NACK messages than the maximum retransmission number are received for the coding block from the receiver.

The ARQ block reception may include receiving the ARQ blocks corresponding to the failed coding block, which are extracted according to the number of the failed coding block and a coding block unit size by the ARQ entity of the transmitter.

If any of the ARQ blocks corresponding to the failed coding block belongs to two or more coding blocks, the ARQ block reception may include receiving the entire ARQ block from the ARQ entity of the transmitter.

The ARQ block reception may include receiving only the ARQ blocks belonging to the failed coding block from the ARQ entity of the transmitter.

The ARQ block reception may include receiving the ARQ blocks belonging to the failed coding block and ARQ blocks that are not yet transmitted to the receiver according to the HARQ operation from the ARQ entity of the transmitter.

Each of the coding blocks may include a CRC.

In another aspect of the present invention, provided herein is a method of associating ARQ with HARQ, including constructing a plurality of coding blocks using an MPDU received from an ARQ entity of a transmitter, transmitting each of the coding blocks to a receiver according to an HARQ operation, transmitting an error message indicating a number of a failed coding block to an ARQ entity of the transmitter after the coding blocks are transmitted according to the HARQ operation, when transmission of the coding block is failed, receiving ARQ blocks corresponding to the failed coding block from the ARQ entity of the transmitter, constructing at least one coding block using the received ARQ blocks, and retransmitting the at least one coding block to the receiver according to the HARQ operation.

The error message transmission may include determining that the transmission of the coding block is failed, when as many NACK messages as a maximum retransmission number or more NACK messages than the maximum retransmission number are received for the coding block from the receiver.

Each of the coding blocks may include a CRC.

In accordance with exemplary embodiments of the present invention, when ARQ and HARQ are operated simultaneously, an erroneous packet is fast retransmitted and unnecessary retransmission of the same data is prevented, since an HARQ packet error is notified rapidly to an ARQ entity. Therefore, a variety of Quality of Service (QoS) requirements are satisfied.

DESCRIPTION OF DRAWINGS

The accompanying drawings, which are included to provide a further understanding of the invention, illustrate embodiments of the invention and together with the description serve to explain the principle of the invention.

In the drawings:

FIGS. 3A to 3D illustrate retransmissions of erroneous blocks in ARQ.

Reference will now be made in detail to the preferred embodiments of the present invention, examples of which are illustrated in the accompanying drawings. To describe a retransmission scheme implemented by a transmitter/receiver in an MS and a BS in the case of simultaneous ARQ and HARQ operations, the following MPDU and HARQ coding block configurations are taken for example. An 1800-byte MPDU is configured to include six ARQ blocks, ARQ block #1 to ARQ block #6, and one HARQ coding block is 7200 bits long. A CRC is attached to each HARQ coding block, thereby facilitate detection of packet errors.

Figure 1:
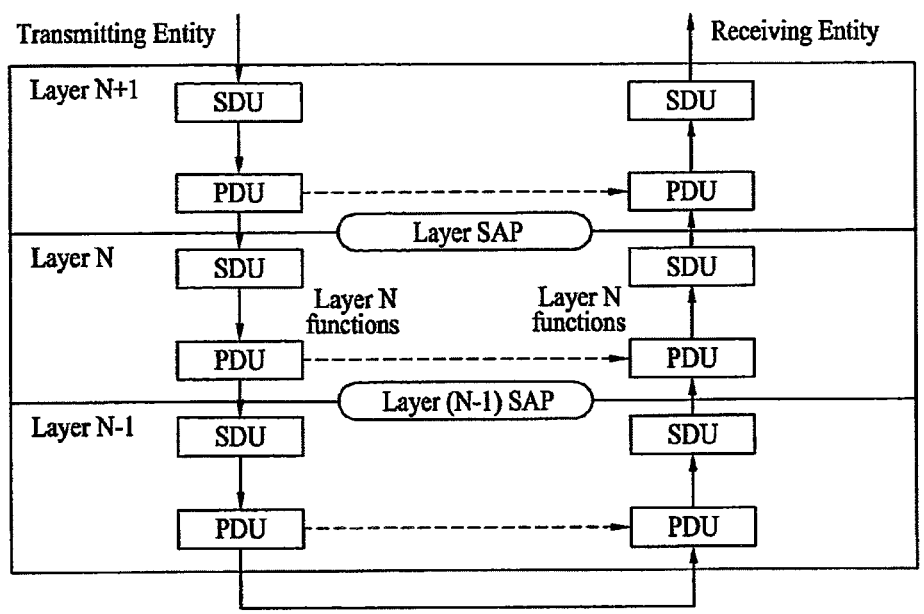
FIG. 1 illustrates a relationship between Protocol Data Units (PDUs) and Service Data Units (SDUs) in a protocol stack.
Figure 2:
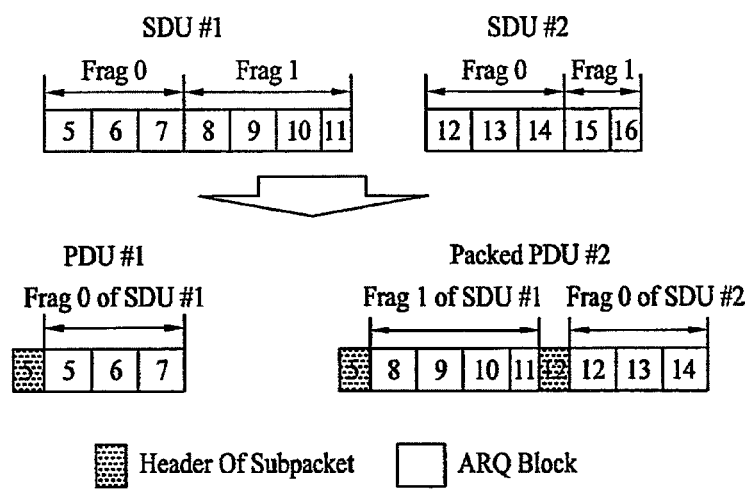
FIG. 2 illustrates an exemplary method of converting an SDU to a PDU.
Figure 4:
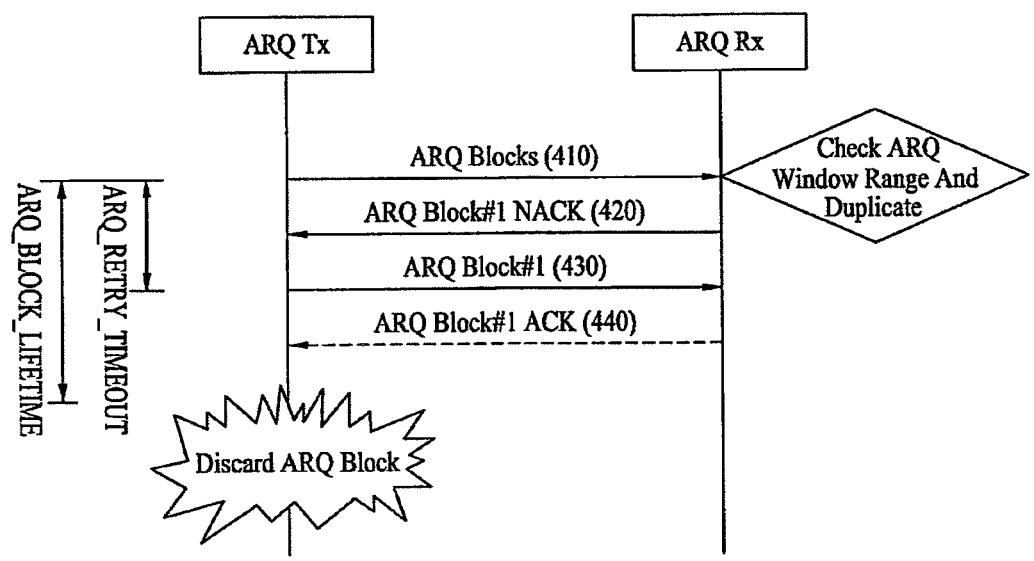
FIG. 4 is a simplified diagram illustrating a signal flow for an ARQ operation.
Figure 5:
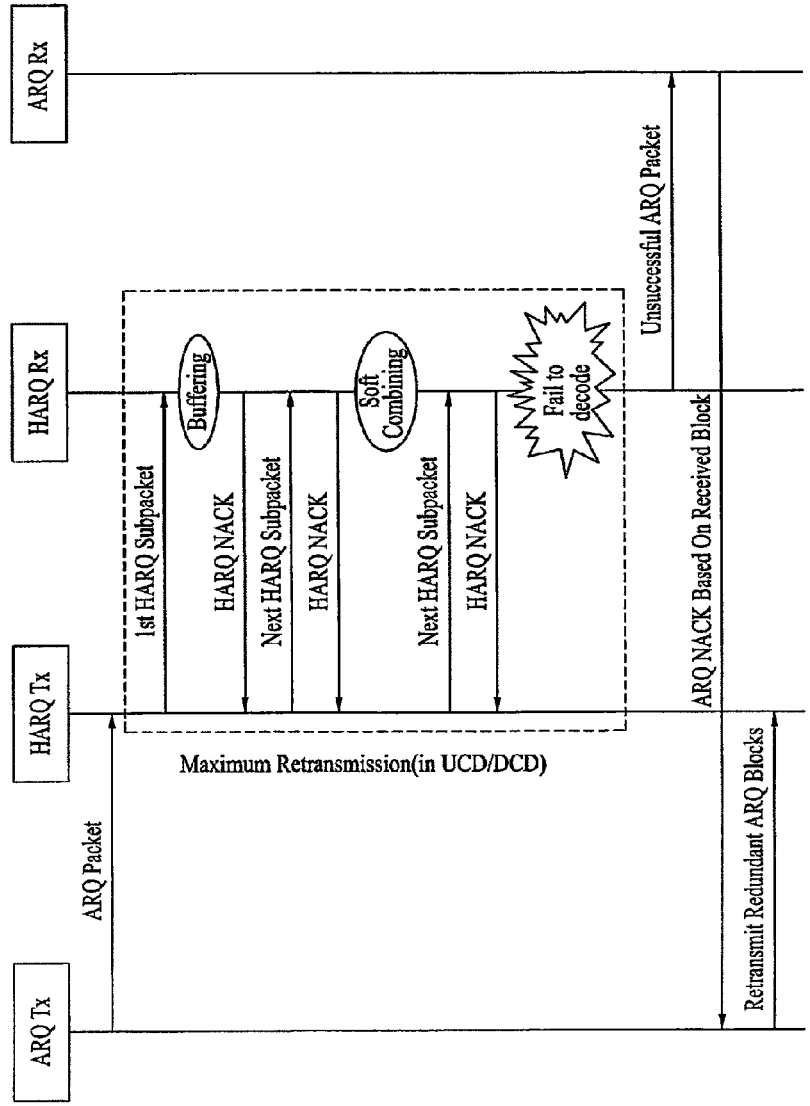
FIG. 5 is a simplified diagram illustrating a signal flow for a conventional ARQ operation involving an HARQ operation.
Figure 6:
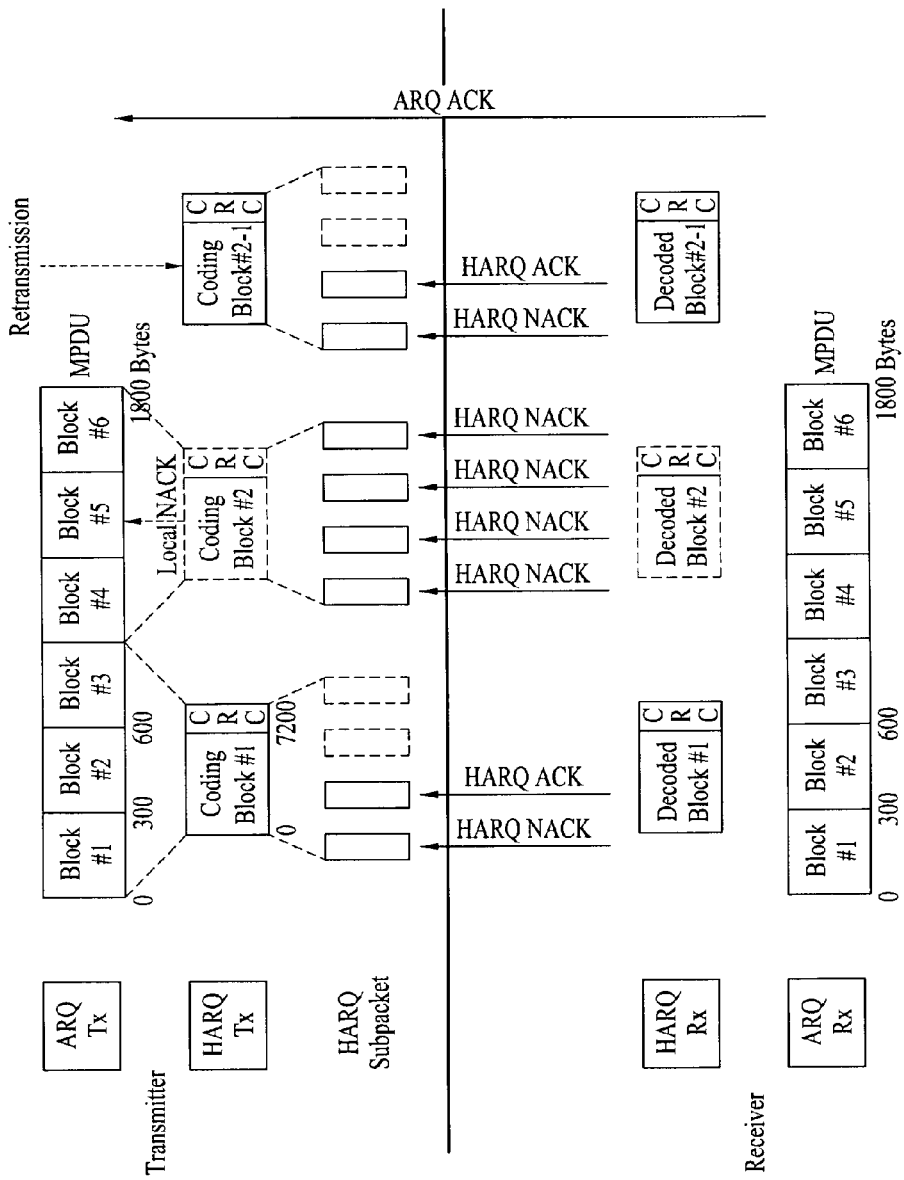
FIG. 6 illustrates an operation for associating ARQ with HARQ according to an exemplary embodiment of the present invention.

FIG. 6 illustrates an operation for associating ARQ with HARQ according to an exemplary embodiment of the present invention.

A description will be made of an operation for transmitting an error message including information about an erroneous coding block, for example, a local NACK message from an HARQ Tx to an ARQ Tx to rapidly notify an error in a previously transmitted MPDU.

An ARQ entity may notify an HARQ entity of an ARQ block size so that a coding block is configured to include an integer number of ARQ blocks. In this case, the ARQ entity may readily use a block that the HARQ entity has partially recovered. In the illustrated case of FIG. 6, a set of one or more ARQ blocks accurately match to a single HARQ coding block in size.

An ARQ Tx segments an SDU received from an upper layer (e.g. an IP layer) into ARQ blocks each having a predetermined size. The ARQ Tx then constructs an MPDU with ARQ blocks by fragmentation or packing according to a transmission situation. This operation may be performed, wholly by the MAC layer or by an ARQ function block. The ARQ Tx transmits the MPDU to a PHY layer. The PHY layer divides a received MPDU or combines received MPDUs into a basic unit. This basic unit is called a coding block unit for an HARQ operation. The HARQ entity notifies the ARQ entity of the size of the basic unit, i.e. the size of the coding block unit (7200 bits in FIG. 6).

The HARQ Tx reconstructs the MPDU received from the ARQ entity based on the coding block unit size. Each coding block is labeled with a coding block number. In the illustrated case of FIG. 6, the MPDU is reconstructed into two HARQ coding blocks. The HARQ/PHY Tx generates HARQ subpackets for each coding block according to a channel coding scheme adapted to a channel status and transmits the HARQ subpackets until receiving an ACK message from an HARQ Rx.

FIG. 6 exemplifies up to four HARQ retransmissions are allowed and four subpackets are generated for one coding block. However the number of subpackets generated at retransmission of the coding block may be changed. The size of an HARQ subpacket depends on Forward Error Correction (FEC) used for HARQ.

After the initial transmission of coding block #1 is failed, a subpacket for coding block #1 is successfully transmitted at a first retransmission. Hence, the HARQ Tx receives an ACK message for the subpacket.

It is assumed that transmission of coding block #2 is failed in spite of as many retransmissions as a maximum retransmission number. Herein, the maximum retransmission number is 4, including an initial transmission.

The HARQ Tx transmits a local NACK message for the failed HARQ coding block to the ARQ Tx. The local NACK message may include the number of the failed HARQ coding block, or the local NACK message and the number of the failed HARQ coding block may be transmitted separately. In the case where the HARQ entity does not notify the ARQ entity of the size of a coding block unit when communications start, it transmits the local NACK message and information about the coding block unit size to the ARQ entity.

The HARQ Rx buffers the successfully received coding block #1 for a predetermined time or until the HARQ process is completed. The predetermined time is a maximum time period during which one HARQ process comprised of a plurality of HARQ coding blocks is completed, as computed by the following formula.

$$Tr \times Tt \times N + a \quad \text{[Equation 1]}$$

Where Tr denotes a maximum retransmission number including an initial transmission for an HARQ coding block, Tt denotes a maximum Round Trip Time (RTT) taken to deliver an HARQ coding block, N denotes the number of HARQ coding blocks in the HARQ process, and a denotes a margin. If one MPDU includes a plurality of HARQ coding blocks, one HARQ process is taken to deliver the MPDU.

Upon receipt of the local NACK message including the HARQ coding block number, the ARQ Tx may estimate ARQ blocks corresponding to the failed coding block. For instance, as regards to the local NACK message for HARQ coding block #2, the coding unit size is 7200 bits and thus the ARQ Tx may determine that ARQ blocks #4, #5 and #6 have been failed. The ARQ Tx reconstructs a retransmission MPDU, that is, ARQ blocks #4, #5 and #6. The retransmission MPDU may include only the failed ARQ blocks or further include the remaining ARQ blocks that are not yet transmitted from the HARQ Tx.

Upon receipt of the retransmission version of the erroneous ARQ blocks from the ARQ Tx, the HARQ Tx constructs a coding block #2-1 with the retransmission ARQ blocks and transmits coding block #2-1 to the receiver. Coding block #2-1 may have a different configuration from coding block #2 that was constructed according to the channel coding scheme and the channel environment of the previous transmission.

The HARQ Rx receives the retransmitted coding block successfully and transmits an ACK message to the transmitter. The HARQ Rx transmits the successfully received HARQ coding block to the ARQ Rx. If a previous decoded block #1 is buffered in a buffer of the HARQ Rx, the HARQ Rx combines decoded block #1 and decoded block #2 into the MPDU and transfers the MPDU to an ARQ Rx.

The ARQ Rx receives the MPDU successfully and transmits an ARQ ACK message to the ARQ Tx.

Figure 7:
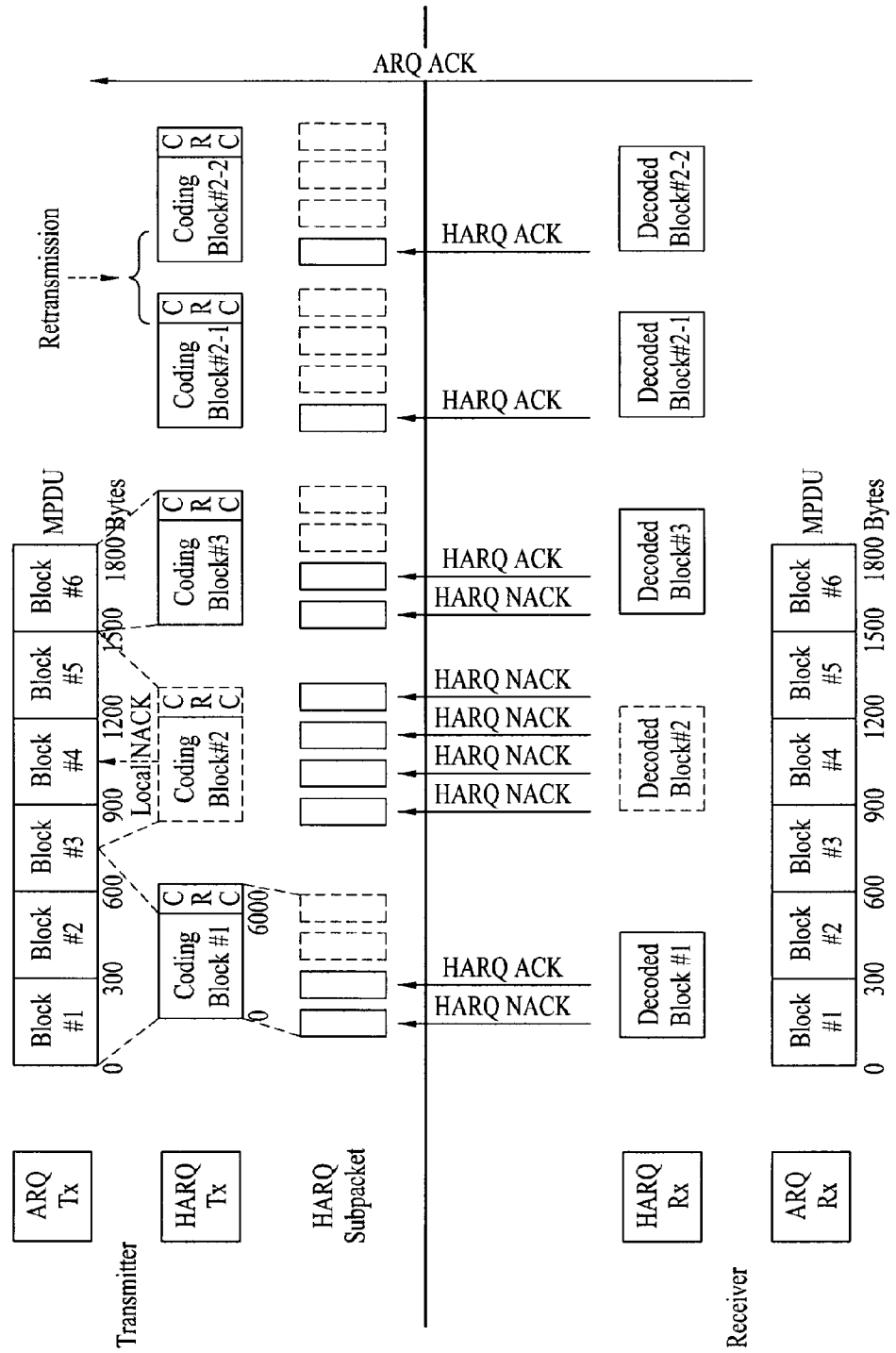
FIG. 7 illustrates an operation for associating ARQ with HARQ according to another exemplary embodiment of the present invention.

FIG. 7 illustrates an operation for associating ARQ with HARQ according to another exemplary embodiment of the present invention.

A description will be made below of an operation for rapidly indicating an MPDU transmission error by transmitting a local NACK message including information about an erroneous coding block from an HARQ Tx to an ARQ Tx.

In the illustrated case of FIG. 7, an HARQ coding block does not accurately match to one or more ARQ blocks, in size. Compared to the case of FIG. 6, a coding block unit is assumed to have 6000 bits and thus a total of three coding blocks are constructed out of an MPDU.

An ARQ Tx segments an SDU received from an upper layer (e.g. an IP layer) into ARQ blocks each having a predetermined size. The ARQ Tx then constructs an MPDU with ARQ blocks by fragmentation or packing according to a transmission situation. This operation may be performed wholly by a MAC layer or by an ARQ function block. The ARQ Tx transmits the MPDU to a PHY layer. The PHY layer divides a received MPDU or combines received MPDUs into a basic unit. This basic unit is called a coding block unit for an HARQ operation. The HARQ entity notifies the ARQ entity of the size of the basic unit, i.e. the size of the coding block unit.

The HARQ Tx generates HARQ coding blocks by rearranging the MPDU received from the ARQ Tx irrespective of the numbers of the ARQ blocks. Each coding block is labeled with a coding block number. For instance, ARQ block #3 may be included in HARQ coding blocks #1 and #2. Herein, the MPDU is reconstructed into three HARQ coding blocks.

The HARQ/PHY Tx generates subpackets for each coding block in a channel coding scheme adapted to a channel status and transmits the subpackets until receiving an ACK message from an HARQ Rx.

In the illustrated case of FIG. 7, the HARQ Tx receives ACK messages for coding blocks #1 and #3 and fails to transmit coding block #2 despite as many retransmissions as a maximum retransmission number.

The HARQ Tx transmits a local NACK message for the failed HARQ coding block to the ARQ Tx. The local NACK message may include the number of the HARQ coding block, or the local NACK message and the number of the HARQ coding block may be transferred separately. In the case where the HARQ entity does not notify the ARQ entity of the size of a coding block unit when communications start, it transmits the local NACK message and information about the coding block unit size to the ARQ entity.

The HARQ Rx buffers the successfully received coding block #1 for a predetermined time or until an HARQ process is completed. The predetermined time is a maximum time period during which one HARQ process comprised of a plurality of HARQ coding blocks is completed, computed by the above Equation 1.

Upon receipt of the local NACK message including the HARQ coding block number, the ARQ Tx determines ARQ blocks #3, 4 and 5 to be erroneous and reconstructs a retransmission MPDU (i.e. ARQ blocks #3, 4 and 5). That is, when the HARQ Tx transmits the local NACK message for HARQ coding block #2 to the ARQ Tx, the ARQ Tx may determine that information carried by ARQ blocks #3, 4 and 5 has been failed, based on the coding block unit size of 6000 bits. Even though part of ARQ block #3 is successfully transmitted, the ARQ Tx retransmits the entire ARQ block #3.

Upon receipt of the partial MPDU (i.e. the MPDU corresponding to ARQ blocks #3, 4 and 5) from the ARQ Tx, the HARQ Tx constructs coding blocks #2-1 and #2-2 and transmits them to the receiver. Coding blocks #2-1 and #2-2 may have a different configuration from coding block #2 that was configured according to the channel coding scheme and the channel environment of the previous transmission.

The HARQ Rx receives the retransmitted coding blocks successfully and transmits ACK messages to the transmitter. In the presence of previous buffered coding blocks #1 and #3, the HARQ Rx concatenates the buffered coding blocks #1 and #3 with the coding blocks #2-1 and #2-2 into an MPDU and transmits the MPDU to an ARQ Rx.

The ARQ Rx receives the MPDU transmitted from the ARQ Tx successfully and transmits an ARQ ACK message to the ARQ Tx.

Figure 8:
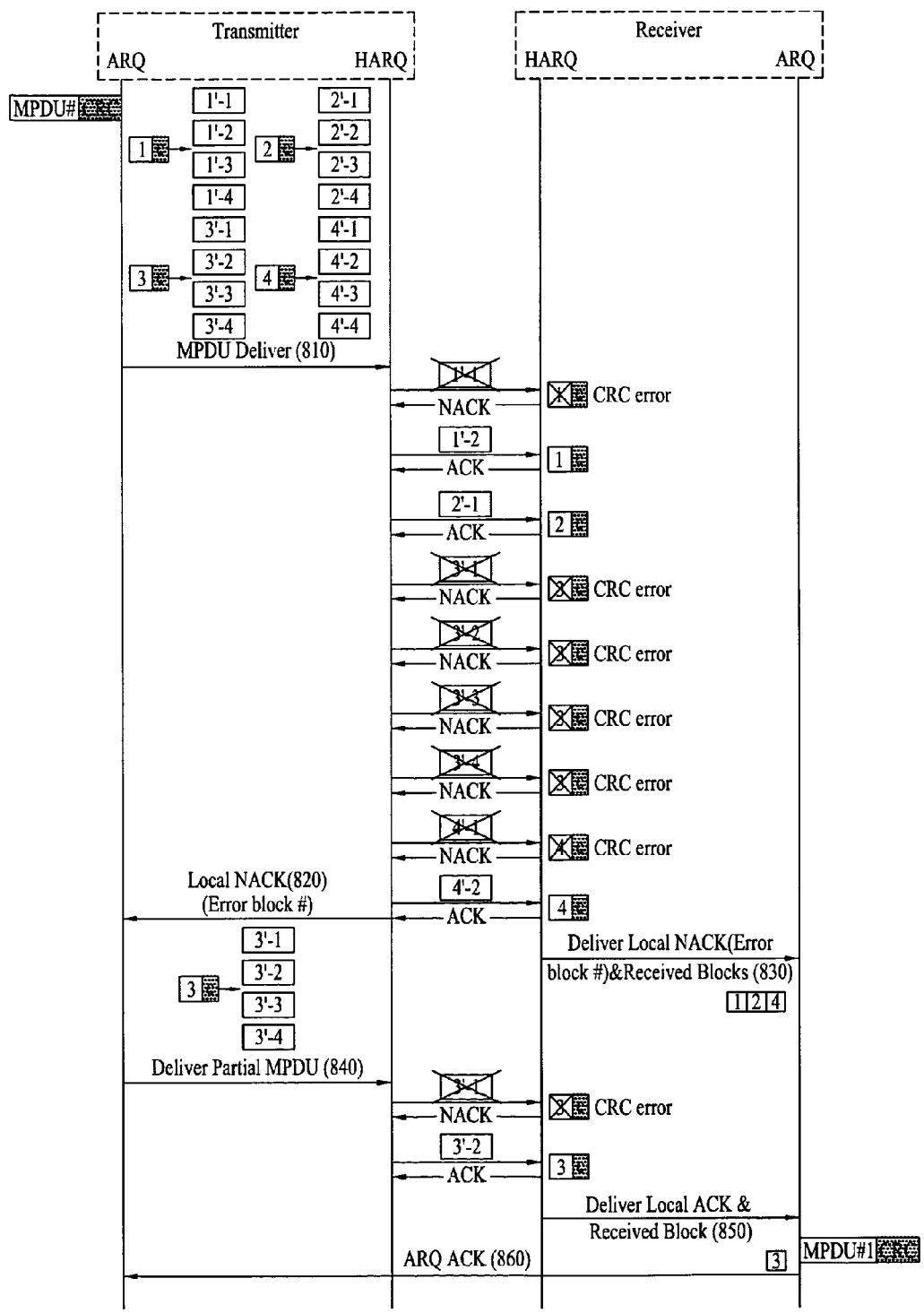
FIG. 8 illustrates an operation for attempting all HARQ coding blocks until an HARQ process is completed according to an exemplary embodiment of the present invention.

FIG. 8 illustrates an operation for attempting to transmit all HARQ coding blocks until an HARQ process is completed according to an exemplary embodiment of the present invention.

Referring to FIG. 8, an ARQ Tx transmits an MPDU to an HARQ Tx in step 810. The HARQ Tx generates a plurality of coding blocks, coding blocks #1 to #4 out of the MPDU and generates a plurality of subpackets for each of coding blocks #1 to #4, for an HARQ process. For instance, the HARQ Tx creates subpackets 1'-1, 1'-2, 1'-3 and 1'-4 for coding block #1.

When an error occurs to a particular HARQ coding block during the HARQ process, the HARQ Tx transmits a local NACK message including the number of the failed HARQ coding block to the ARQ Tx, after the HARQ process is completed, in step 820.

Meanwhile, an HARQ Rx transmits successfully received coding blocks to an ARQ Rx, notifying the ARQ Rx of the number of the failed coding block by a local NACK message in step 830.

The ARQ Tx constructs a new MPDU with erroneous ARQ blocks and transfers the new MPDU to the HARQ Tx in step 840.

When the HARQ Rx receives coding block #3 successfully, it transmits coding block #3 to the ARQ Rx, notifying the ARQ Rx of the number of the successfully received coding block by a local ACK message in step 850.

Steps 820 to 850 are repeated until the MPDU is delivered without errors or a predetermined time for ARQ expires. An error check may be performed on the MPDU by checking the CRC of the MPDU.

Upon completion of the MPDU reception, the ARQ Rx transmits an ARQ ACK message to the ARQ Tx in step 860.

Figure 9:
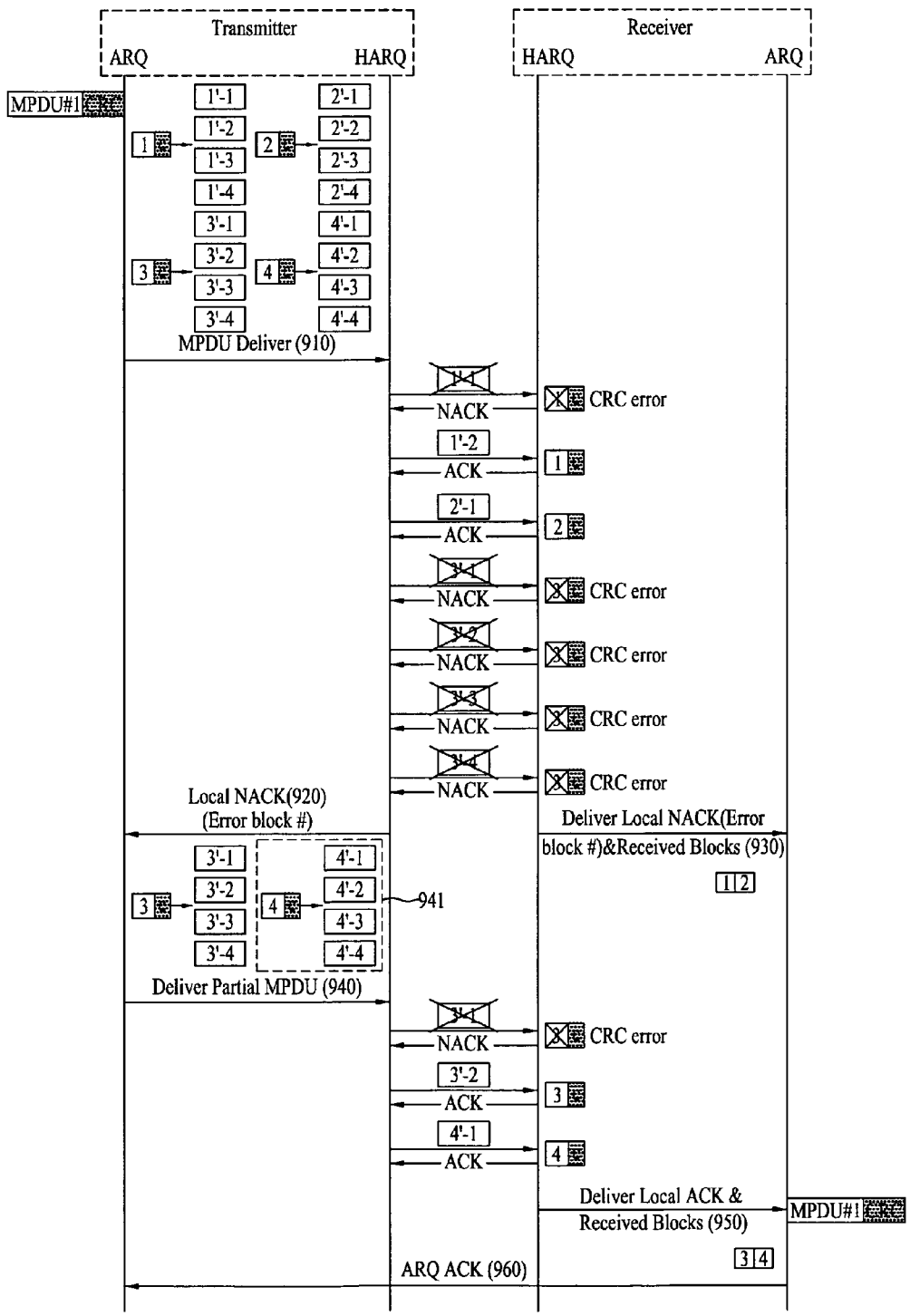
FIG. 9 illustrates an operation for discontinuing an HARQ process when an error occurs to a coding block according to another exemplary embodiment of the present invention.

FIG. 9 illustrates an operation for discontinuing an HARQ process when an error occurs to a coding block according to another exemplary embodiment of the present invention.

Referring to FIG. 9, an ARQ Tx transmits an MPDU to an HARQ Tx in step 910. The HARQ Tx generates a plurality of coding blocks, coding blocks #1 to #4 out of the MPDU and creates a plurality of subpackets for each of coding blocks #1 to #4, for an HARQ process.

When an error occurs to a particular HARQ coding block during the HARQ process, the HARQ Tx discontinues the HARQ process without attempting to transmit the next HARQ coding block. The HARQ Tx and an HARQ Rx notify the ARQ Tx and the ARQ Rx of the number of the failed coding block by local NACK messages, respectively in steps 920 and 930. Especially, the HARQ Rx transfers successfully received coding blocks to the ARQ Rx, notifying the ARQ Rx of the number of the failed coding block by the local NACK message in step 930.

In step 940, the ARQ Tx constructs a new MPDU with erroneous ARQ blocks and transmits the new MPDU to the HARQ Tx.

If the HARQ Tx has buffered coding blocks of which the transmissions have not been attempted, the ARQ Tx simply transmits only the erroneous ARQ blocks. On the other hand, if the HARQ Tx has not buffered the coding blocks that are not yet transmitted, the ARQ Tx further transfers ARQ blocks 941 which are not yet transmitted.

Upon successful receipt of coding block #3 and the following coding blocks, the HARQ Rx transmits the received coding blocks to the ARQ Rx, notifying the ARQ Rx of the numbers of the coding blocks by a local ACK message in step 950.

Steps 920 to 950 are repeated until the MPDU is delivered without errors or a predetermined time for ARQ expires. An error check may be carried out for the MPDU by checking the CRC of the MPDU.

Upon completion of the MPDU reception, the ARQ Rx transmits an ARQ ACK message to the ARQ Tx in step 960.

Meanwhile, the ARQ Tx may construct a new MPDU with ARQ blocks included in an MPDU to be retransmitted and ARQ blocks included in a next MPDU and transmit the new MPDU to the HARQ Tx in FIGS. 8 and 9.

The exemplary embodiments of the present invention provide a packet transmission method of effectively using resources, ensuring reliability through association between ARQ and HARQ. The exemplary embodiments of the present invention are applicable to devices such as a BS, an MS, or the like in a system such as an Institute of Electrical and Electronics Engineers (IEEE) 802.16m system or the like.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of associating Automatic Repeat reQuest (ARQ) with Hybrid Automatic Repeat reQuest (HARQ), comprising:
   constructing at least one coding block using ARQ blocks received from an ARQ entity of a transmitting side;
   transmitting each of the at least one coding block to a receiving side according to a HARQ operation;
   transmitting an error message indicating a number of a transmission failure coding block to the ARQ entity of the transmitting side, wherein the error message includes a size of a coding block unit of the at least one coding block;
   receiving at least one ARQ block corresponding to the transmission failure coding block from the ARQ entity of the transmitting side, wherein the received at least one ARQ block is constructed based on the number of the transmission failure coding block and the size of the coding block unit;
   constructing another at least one coding block using the at least one ARQ block corresponding to the transmission failure coding block; and
   retransmitting the another at least one coding block to the receiving side according to the HARQ operation.

2. The method according to claim 1, wherein the error message transmission comprises determining that a transmission of a coding block has failed, when as many Negative ACKnowledgment (NACK) messages as a number of maximum retransmission times or more NACK messages than the number of maximum retransmission times are received for the coding block from the receiving side.

3. The method according to claim 1, wherein the ARQ block reception comprises receiving the ARQ blocks corresponding to the transmission failure coding block, which are extracted according to the number of the transmission failure coding block and the size of the coding block unit by the ARQ entity of the transmitting side.

4. The method according to claim 1, wherein the ARQ block reception comprises, if any of the at least one ARQ block corresponding to the transmission failure coding block belongs to two or more coding blocks, receiving the entire ARQ block from the ARQ entity of the transmitting side.

5. The method according to claim 1, wherein the at least one ARQ block reception comprises receiving only at least one ARQ block belonging to the transmission failure coding block from the ARQ entity of the transmitting side.

6. The method according to claim 1, wherein the at least one ARQ block reception comprises receiving at least one ARQ block belonging to the transmission failure coding block and ARQ blocks that are not yet transmitted to the receiving side according to the HARQ operation from the ARQ entity of the transmitting side.

7. The method according to claim 1, wherein each of the at least one coding block includes a Cyclic Redundancy Check (CRC).

* * * * *